United States Patent
Taropa

(10) Patent No.: US 11,734,292 B2
(45) Date of Patent: *Aug. 22, 2023

(54) CLOUD INFERENCE SYSTEM

(71) Applicant: Google LLC, Mountain View, CA (US)

(72) Inventor: Emanuel Taropa, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,258

(22) Filed: Jul. 7, 2022

(65) Prior Publication Data
US 2022/0335042 A1    Oct. 20, 2022

Related U.S. Application Data

(63) Continuation of application No. 16/575,058, filed on Sep. 18, 2019, now Pat. No. 11,403,314, which is a
(Continued)

(51) Int. Cl.
*G06F 16/24* (2019.01)
*G06F 16/248* (2019.01)
(Continued)

(52) U.S. Cl.
CPC ........ *G06F 16/248* (2019.01); *G06F 16/2228* (2019.01); *G06F 16/2455* (2019.01);
(Continued)

(58) Field of Classification Search
CPC ............... G06F 16/248; G06F 16/2228; G06F 16/2455; G06F 16/2474; G06F 16/2477; G06F 16/285; G06F 16/2465
See application file for complete search history.

(56) References Cited

U.S. PATENT DOCUMENTS 5,991,735 A    11/1999 Gerace
6,014,638 A    1/2000 Burge et al.
(Continued)

FOREIGN PATENT DOCUMENTS

GB          2506716 A      4/2014
WO    2003/032125 A2      4/2003

OTHER PUBLICATIONS

Wikipedia.com [online] "Nervana Systems," Last Update: Feb. 5, 2017 [retrieved on Feb. 15, 2017] Retrieved from Internet URL<https://en.wikipedia.org/wiki/Nenrana_Systems> 2 pages.
(Continued)

*Primary Examiner* — Merilyn P Nguyen
(74) *Attorney, Agent, or Firm* — Honigman LLP; Brett A. Krueger

(57) ABSTRACT

Methods, systems, and apparatus, including computer programs encoded on computer storage media, for storing and accessing data in a cloud system. One of the methods includes receiving an identification of log data that records occurrences of events; receiving a specification of a plurality of different event types to be indexed; indexing the log data according to the specification and group identifiers; receiving a query specifying a reference parameter and requesting one or more predicted events; searching the indexed groups to identify a plurality of groups having events associated with the reference parameter; computing one or more predicted events, from the identified plurality of groups, that are most likely to co-occur in the indexed groups with events associated with the reference parameter; and providing the computed one or more predicted events.

20 Claims, 5 Drawing Sheets

Related U.S. Application Data continuation of application No. 15/499,398, filed on Apr. 27, 2017, now Pat. No. 10,423,638.

(51) Int. Cl.
| | |
|---|---|
| G06F 16/28 | (2019.01) |
| G06F 16/22 | (2019.01) |
| G06F 16/2455 | (2019.01) |
| G06F 16/2458 | (2019.01) |

(52) U.S. Cl.
CPC ...... *G06F 16/2474* (2019.01); *G06F 16/2477* (2019.01); *G06F 16/285* (2019.01); *G06F 16/2465* (2019.01)

(56) References Cited

U.S. PATENT DOCUMENTS

| | | |
|---|---|---|
| 6,317,718 B1 | 11/2001 | Fano |
| 7,565,157 B1 | 7/2009 | Ortega et al. |
| 7,644,121 B2 | 1/2010 | Swanson et al. |
| 7,698,422 B2 | 4/2010 | Vanderhook et al. |
| 7,917,480 B2 | 3/2011 | Dean et al. |
| 7,925,743 B2 | 4/2011 | Neely et al. |
| 8,180,892 B2 | 5/2012 | Deridder et al. |
| 8,887,286 B2 * | 11/2014 | Dupont ............... G06F 21/50 726/25 |
| 8,966,036 B1 | 2/2015 | Asgekar et al. |
| 8,979,753 B2 | 3/2015 | Corsetti et al. |
| 9,195,703 B1 | 11/2015 | Kirmse et al. |
| 9,298,852 B2 | 3/2016 | Taropa et al. |
| 9,361,406 B1 | 6/2016 | Taropa et al. |
| 9,363,634 B1 | 6/2016 | Kirmse et al. |
| 9,639,581 B1 | 5/2017 | Taropa et al. |
| 10,268,660 B1 | 4/2019 | Arazi |
| 10,305,758 B1 | 5/2019 | Bhide et al. |
| 10,447,526 B2 | 10/2019 | Tucker et al. |
| 10,505,825 B1 | 12/2019 | Bettaiah et al. |
| 10,949,765 B2 | 3/2021 | Duraisamy Soundrapandian et al. |
| 11,055,405 B1 * | 7/2021 | Jin .................. H04L 63/1425 |
| 11,093,873 B2 * | 8/2021 | Chung ............... G06F 16/9035 |
| 11,301,475 B1 * | 4/2022 | Lei ................... G06F 16/24554 |
| 2001/0049674 A1 | 12/2001 | Talib et al. |
| 2002/0123988 A1 | 9/2002 | Dean et al. |
| 2002/0198882 A1 | 12/2002 | Linden et al. |
| 2004/0215607 A1 | 10/2004 | Travis |
| 2005/0010564 A1 | 1/2005 | Metzger et al. |
| 2006/0036593 A1 | 2/2006 | Dean et al. |
| 2006/0053090 A1 | 3/2006 | Cotter et al. |
| 2006/0287096 A1 | 12/2006 | O'Kelley et al. |
| 2007/0005419 A1 | 1/2007 | Horvitz et al. |
| 2007/0220023 A1 | 9/2007 | Dean et al. |
| 2007/0233671 A1 | 10/2007 | Oztekin et al. |
| 2008/0005071 A1 | 1/2008 | Flake et al. |
| 2008/0201311 A1 | 8/2008 | Ertugrul et al. |
| 2008/0250026 A1 | 10/2008 | Linden et al. |
| 2009/0063268 A1 | 3/2009 | Burgess et al. |
| 2009/0125321 A1 | 5/2009 | Charlebois et al. |
| 2009/0163183 A1 | 6/2009 | O'Donoghue et al. |
| 2009/0299857 A1 | 12/2009 | Brubaker |
| 2010/0217879 A1 | 8/2010 | Weiner |
| 2011/0040733 A1 | 2/2011 | Sercinoglu et al. |
| 2011/0289068 A1 | 11/2011 | Teevan et al. |
| 2012/0036123 A1 | 2/2012 | Hasan et al. |
| 2012/0047025 A1 | 2/2012 | Strohman |
| 2012/0137367 A1 * | 5/2012 | Dupont ............... G06F 21/00 726/25 |
| 2012/0290399 A1 | 11/2012 | England et al. |
| 2012/0311465 A1 | 12/2012 | Nealer et al. |
| 2013/0031106 A1 | 1/2013 | Schechter et al. |
| 2013/0060868 A1 | 3/2013 | Davis et al. |
| 2013/0061333 A1 | 3/2013 | Davis et al. |
| 2013/0110505 A1 | 5/2013 | Gruber et al. |
| 2013/0110515 A1 | 5/2013 | Guzzoni et al. |
| 2013/0111348 A1 | 5/2013 | Gruber et al. |
| 2013/0111487 A1 | 5/2013 | Cheyer et al. |
| 2013/0117022 A1 | 5/2013 | Chen et al. |
| 2013/0185232 A1 | 7/2013 | Hochstein |
| 2014/0129942 A1 | 5/2014 | Rathod |
| 2014/0278308 A1 | 9/2014 | Liu et al. |
| 2014/0280291 A1 | 9/2014 | Collins et al. |
| 2014/0280952 A1 | 9/2014 | Shear et al. |
| 2017/0053008 A1 | 2/2017 | Frenkel et al. |
| 2017/0192872 A1 * | 7/2017 | Awad .................. G06F 11/3072 |
| 2017/0309196 A1 | 10/2017 | Vangala et al. |
| 2018/0089188 A1 * | 3/2018 | Kharisma .............. H04L 67/02 |
| 2018/0165173 A1 * | 6/2018 | Lin ..................... G06F 16/285 |
| 2018/0183821 A1 * | 6/2018 | Schneider ............ G06F 16/285 |
| 2018/0218269 A1 | 8/2018 | Oliner et al. |
| 2018/0276256 A1 * | 9/2018 | Sarkar ................. G06F 18/2321 |
| 2018/0285827 A1 | 10/2018 | Dotan-Cohen et al. |
| 2019/0033351 A1 * | 1/2019 | Takata ................. G06F 9/5038 |
| 2019/0095599 A1 * | 3/2019 | Iliofotou .............. G06F 16/337 |

OTHER PUBLICATIONS www.pcworld.com [online] "Nervana's cloud platform makes deep learning more widely available," Katherine Noyes, Feb. 29, 2016, [retrieved on Feb. 15, 2017] Retreived from Internet URL<http://www.pcworld.com/article/3039437/nervanas-cloud-platform-makes-deep-learning-more-widely-available.html> 4 pages.

Barroso et al., "Web Search for a Planet: The Google Cluster Architecture," IEEE Mirco, Mar.-Apr. 2003, 7 pages.

Bennett, Paul N., et al., "Inferring and Using Location Metadata to Personalize Web Search", SIGIR '11, Beijing, China, Jul. 24-28, 2011 pp. 135-144.

Bilenko, Mikhail, et al., "Mining the Search Trails of Surfing Crowds: Identifying Relevant Websites from User Activity", WWW 2008, Beijing, China, Apr. 21-25, 2008, pp. 51-60.

Eirinaki, Magdalini, et al., "Web Mining for Web Personalization", ACM Transactions on Internet Technology, vol. 3, No. 1, Feb. 2003, pp. 1-27.

International Search Report and Written Opinion issued in International Application No. PCT/US2018/026799, dated Oct. 1, 2018, 17 pages.

Invitation to Pay Additional Fees and, Where Applicable, Protest Fee, issued in International Application No. PCT/US2018/026799, dated Jun. 14, 2018, 13 pages.

Khungar, Sharat, et al., "A Context Based Storage for Ubiquitous Computing Applications", EUSAI 2004, Eindhoven, The Netherlands, Nov. 8-10, 2004, pp. 55-58.

Liu, Jiahui, et al., "Personalized News Recommendation Based on Click Behavior", IUI '10, Hong Kong, China, Feb. 7-10, 2010, pp. 31-40.

Mobasher, Bamshad, et al., "Effective Personalization Based on Association Rule Discovery from Web Usage Data", WIDM 2001, Atlanta, GA, © 2001, pp. 9-15.

Mobasher, Bamshad, et al., "Integrating Web Usage and Content Mining for More Effective Personalization", EC-Web 2000, LNCS 1875, Springer-Verlag, Berlin, Germany, © 2000, pp. 165176.

Mrabet, Yassine, et al., "Recognising Professional-Activity Groups and Web Usage Mining for Web Browsing Personalization", WI 2007, Fremont, CA, Nov. 2-5, 2007, pp. 719-722.

PCT International Preliminary Report on Patentability in International Appln. No. PCT/US2018/026799, dated Oct. 29, 2019, 10 pages.

White, Ryen W., et al., "Predicting User Interests from Contextual Information", SIGIR '09, Boston, MA, Jul. 19-23, 2009, pp. 363-370.

Wu, Xiao, et al., "Real-Time Near-Duplicate Elimination for Web Video Search With Content and Context", IEEE Transactions on Multimedia, vol. 11, No. 2, Feb. 2009, pp. 196-207.

Yan' Tingxin, et al., "Fast App Launching for Mobile Devices Using Predictive User Context", MobiSys '12, Low Wood Bay, Lake District, UK, Jun. 25-29, 2012, pp. 113-126.

\* cited by examiner

CLOUD INFERENCE SYSTEM

CROSS REFERENCE TO RELATED APPLICATION

This U.S. patent application is a continuation of, and claims priority under 35 U.S.C. § 120 from, U.S. patent application Ser. No. 16/575,058, filed on Sep. 18, 2019, now U.S. Pat. No. 11,403,314, which is a continuation of U.S. patent application Ser. No. 15/499,398, filed on Apr. 27, 2017, now U.S. Pat. No. 10,423,638. The disclosures of these prior applications are considered part of the disclosure of this application and are hereby incorporated by reference in their entireties.

TECHNICAL FIELD

This disclosure relates to cloud inference systems.

BACKGROUND

Cloud computing systems may provide access to various computing resources. For example, a cloud computing system may store data for a client device which may be accessible by multiple different devices, allow multiple different client devices to access a single application executing on the cloud, and provide access to other computer resources.

SUMMARY

A user can provide user-generated log data to an inference system so that the inference system can make predictions and inferences about events represented in the log data. The user can control which events in the log data are indexed by the inference system as well as how the events should be indexed.

The inference system may include an inference controller that receives application programming interface (API) requests from a client device. The inference controller determines whether the request identifies a query, e.g., a get request, or identifies a data management call, e.g., a post or a list request. When the request identifies a query, the inference controller converts the request to a standardized format and provides the converted request to a query processing system.

The query processing system uses data from the request to predict events that are most likely to co-occur. For instance, the query processing system determines a reference parameter, identified in the request. The inference controller may convert the request to a format for the query processing system and provide the converted request to the query processing system. The query processing system searches indexed groups of events, created by a dataset system, to determine groups that have events associated with the reference parameter. The query processing system uses the determined groups of events to predict events that are most likely to co-occur in the determined groups of events.

For instance, the query processing system may receive a query for the top five most likely cities to which a particular airline flies. The query processing system uses the name of the particular airline to determines groups of events, e.g., flights, operated by the particular airline. The query processing system then analyzes the determined groups of events to predict the top five most likely cities to which the particular airline flies.

The query processing system provides the predicted events. For example, the query processing system may provide the predicted events to a user device, another system, or both. The other system may use the predicted events to perform one or more operations, such as updating rules to an intrusion prevention system when the events relate to network security or selecting advertisements when the events relate to purchases, to name a few examples.

When the request identifies a data management call, the inference controller converts the request to a standardized format and provides the request to a dataset system. The dataset system stores data for the request as an entry in a global state queue. Dataset controllers, included in the dataset system, poll the global state queue for work. When a dataset controller retrieves an entry for the request from the global state queue, the dataset controller analyzes the entry and determines the particular instructions included in the request, e.g., create, delete, or list. The dataset controller then performs operations for the request.

When a dataset controller has available resources to perform tasks for a work item, the dataset controller polls the global state queue and, in response, receives data identifying entries in the global state queue. To reduce the amount of data the dataset controller receives in response to the poll, the dataset controller may receive a minimal amount of data, e.g., hundreds of bytes of data, that identify, for each of multiple entries, a state bit, a create time, a modify time, and a done time. The dataset controller may use the received data to determine if any entries, and corresponding work items, have outstanding tasks to perform and for which entry to perform a task. When the dataset controller determines to perform tasks for an entry, the dataset controller updates the global state queue to identify the dataset controller as the owner of the entry, e.g., using an identifier for the global state queue.

For instance, the dataset controller may use the state bit to determine whether the entry has been assigned to a dataset controller. The dataset controller may use the create time to determine when the entry was added to the global state queue. The dataset controllers may generally perform tasks for work items in the order in which the corresponding entries were added to the global state queue as indicated by the create time. The dataset controller may use the done time to determine whether all tasks for an entry have been performed.

The dataset controller may use the modify time to ensure that a dataset controller continues to perform work for the entry. For instance, when a particular dataset controller makes progress on work for an entry, the particular dataset controller will continue to update the state, as being worked on, and the modify time. If the particular dataset controller crashes or loses access to resources required to perform work, the state bit may continue to indicate that the entry is being worked on but the modify time for the entry will not be updated. The dataset controller may determine that when the modify time has not been updated for more than a timeout time period, that work is not being performed and to take ownership of the entry.

When a dataset controller takes ownership of an entry from the global state queue, the dataset controller requests additional data for the entry. For instance, the dataset controller receives the entire entry for a work item which may be hundreds of bytes or thousands of bytes. The entry may include metadata such as a full descriptor of the work item, structured data to be added to the system, e.g., using a create request, data identifying input sources, or other appropriate types of data.

When a dataset controller performs tasks for a create request, a dataset controller may retrieve structured data identified by a corresponding request and store data in memory in a standardized format. The standardized format may be a highly efficient index. In some examples, the standardized format may be an inverted index. The standardized format allows the query processing system to perform queries across the received data.

The dataset system allows a client device to request removal of data from the dataset system. When the dataset system removes data the query processing system no longer has access to the data. A client device may request removal of data to reduce the resources allocated to the client device on the dataset system, the query processing system, or both.

The subject matter described in this disclosure can be implemented in various implementations and may result in one or more of the following advantages. In some implementations, the systems and methods described below allow efficient computation of predicted events using indexed groups of events, e.g., without exponential growth in the amount of time necessary to compute the predicted events based on the size of the dataset. In some implementations, the systems and methods described below provide an efficient query syntax irrespective of an underlying data type for which the system will compute predicted events. In some implementations, the systems and methods described below may perform inference queries over user-provided data to perform collaborative filtering, anomaly and trend detection, timeline retrieval, or a combination of two or more of these. For instance, the systems and methods described below allow inference over large scale datasets, real time datasets, time-series datasets, user supplied datasets, or a combination of two or more of these. In some implementations, the systems and methods described below allow inference from a single time series type, e.g., volume readings, to the same time series type, e.g., volume readings conditioned by other volume readings. For example, the time series type included in a query can be included in a response. In some implementations, the use of a global state queue reduces duplicative processing for a work item assigned to a dataset controller that goes offline, allows efficient processing of work items given a time at which the item was added to the global state queue, allows a dataset controller to efficiently select a work item by initially retrieving only a subset of data for multiple work items in the global state queue, or a combination of two or more of these. In some implementations, the systems and methods described below are datatype agnostic, e.g., and compute predicted events using conditions irrespective of the type of the data.

The details of one or more implementations of the subject matter described in this disclosure are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
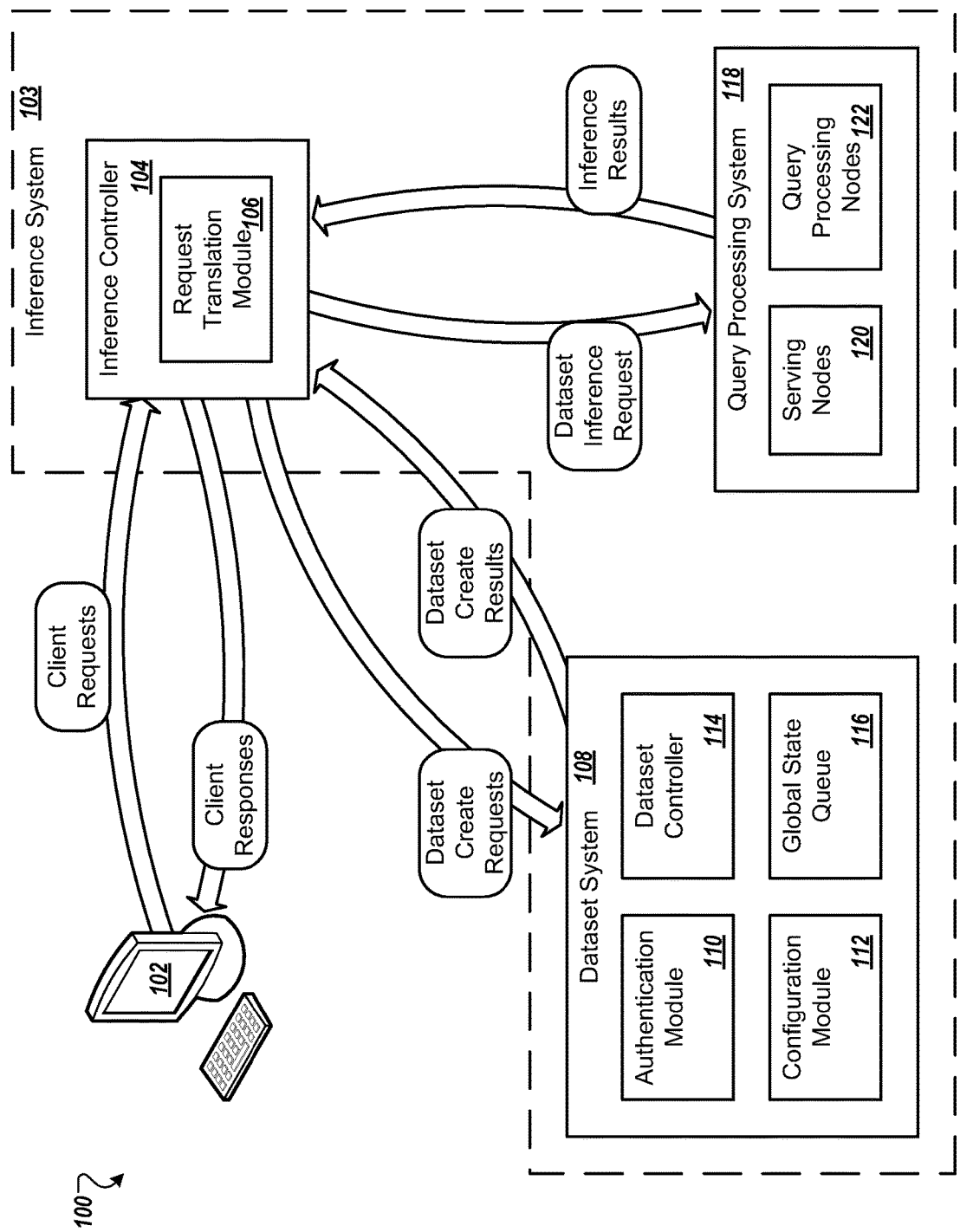
FIG. 1 is an example of a computing environment that includes an inference system.

FIG. 1 is an example of a computing environment 100 that includes an inference system 103. The computing environment 100 includes a client device 102 that can send log data to the inference system 103, e.g., an inference controller 104. The client device 102 can receive, from the inference system 103, data for a predicted event, e.g., a probability distribution given one or more conditions. For instance, the inference system 103 may include the inference controller 104, a dataset system 108, and a query processing system 118. The inference controller 104 can communicate with a dataset system 108 and a query processing system 118 for the processing of the log data, e.g., time series data. The query processing system 118 can perform anomaly detection, trend detection, timeline analysis, or a combination of two or more of these, on the log data, e.g., the time series data, to determine the predicted event. Some examples of predicted events can include whether a particular computer system is vulnerable to a particular computer exploit, the likelihood that an event occurs given one or more conditions, or the top five cities to which an airline is likely to fly.

The inference controller 104 includes an application programming interface (API) that accepts requests from the client device 102. The API may include options to create, delete, and query stored datasets from log data that records data representing occurrences of events. The events may be time series events or another type of event. The API may include an option to list the status of a dataset, list all of the datasets for a particular client, or both.

A request to create a dataset may include a dataset name, data names for the dataset, one or more data sources, or a combination of two or more of these. The environment 100, e.g., the client device or the inference controller 104 or both, may use the dataset name for queries or functions associated with the dataset. When a request includes a list of data names, the dataset system 108 uses the data names to determine variables for the events that are extracted from the log data and stored in the dataset. Examples of variables may include "vulnerability," "carrier," and "region," as described in more detail below. The request may include one or more uniform resource identifiers that indicate respective data sources for the log data. The dataset system 108 retrieves data from the data sources, using the uniform resource identifiers, and creates the dataset using the retrieved data.

When the inference controller 104 receives a request to create a dataset from the client device 102, the inference controller 104 provides data for the request to the dataset system 108 to cause the dataset system 108 to create a dataset using log data identified by the request. In some examples, the log data may be JavaScript Object Notation (JSON), newline delimited data for which each line indicates one event. Each event may include one or more timestamps. Each event may correspond to a single data name specified by the request.

In some implementations, a request translation module 106, included in the inference controller 104 or otherwise communicating with the inference controller 104, may translate the request to a format for the dataset system 108. For example, the inference controller 104 may receive a request in a first format from the client device 102. The request translation module 106 may convert the received request to a second format that is a different format than the first format. The inference controller 104 or the request translation module 106 may send the converted request, that is in the second format, to the dataset system 108 to cause the dataset system 108 to create a dataset using the request.

The dataset system 108 may process the request, received from the client device 102 or the converted request. The processing may include authenticating the request, determining configuration parameters for the request, creating a dataset for the request, or two or more of these. For instance, an authentication module 110 may determine whether the client device 102 is authorized to submit requests to the inference controller 104, whether the client device 102 has access to the data sources, whether resources are available to process the request from the client device 102, or a combination of two or more of these.

A configuration module 112 may determine one or more parameters for processing requests on behalf of the client device 102. For example, the configuration module 112 may determine indexing settings for the client device 102. The settings may be specific to the client device 102. The settings may be specific to an account for the client device 102, e.g., for which other client devices may submit other requests.

In some examples, the create request may refer to a file that includes the data for the request, such as the dataset name, the data names, the data sources, or a combination of two or more of these. One example of a file for a create request is shown in Table 1, below.

TABLE 1

Create Request File

```
{       name:"ntsb_airline",
        data_names: [
                "passengers",
                "distance",
                "carrier_name",
                "origin_city_name",
                "dest_city_name" ],
        data_sources: [
                { uri:"abc://abc-airline-data/s-0" },
                { uri:"abc://abc-airline-data/s-1" },
                { uri:"abc://abc-airline-data/s-2" },
                { uri:"abc://abc-airline-data/s-3" }
        ] }
```

In the example shown in Table 1, the create request specifies a name of "ntsb_airline" as the dataset name; includes five data names: "passengers," "distance," "carrier_name," "origin_city_name," and "dest_city_name"; and identifies four data sources: "abc://abc-airline-data/s-0", "abc://abc-airline-data/s-1", "abc://abc-airline-data/s-2", and "abc://abc-airline-data/s-3". When the create request, whether a file or the request received by the inference controller 104, does not include data names, the dataset system 108 may determine the data names from the log data identified by the data sources. When the create request specifies one or more data names, the dataset system 108 only uses those specified data names when creating a dataset and ignores any other data names that may be included in the log data identified by the data sources. For instance, the dataset system 108 only creates variables for the data names included in the create request when the create request specifies data names and may discard other data.

Table 2, below, shows one example of a portion of log data that a user can specify as a data source. The log data may include additional data that the dataset system 108 does not use when creating a dataset. In the example described above about an airline, log data, whether in the same file or a different file, could include one or more lines with data names of "passengers," "distance," "origin_city_name," and "dest_city_name."

TABLE 2

Log Data

{"dataName":"unique_carrier_entity","dataValue":"0A285","endTime":"1991-02-01T00:00:00Z","groupId":"197071991","startTime":"1991-01-01T00:00:00Z"}
{"dataName":"region","dataValue":"D","endTime":"1991-02-01T00:00:00Z","groupId":"197071991","startTime":"1991-01-01T00:00:00Z"}
{"dataName":"carrier","dataValue":"ABC","endTime":"1991-02-01T00:00:00Z","groupId":"197071991","startTime":"1991-01-01T00:00:00Z"}
{"dataName":"carrier_name","dataValue":"ABC Airline","endTime":"1991-02-01T00:00:00Z","groupId":"197071991","startTime":"1991-01-01T00:00:00Z"}
{"dataName":"carrier_group","dataValue":"3","endTime":"1991-02-01T00:00:00Z","groupId":"197071991","startTime":"1991-01-01T00:00:00Z"}

The dataset system 108, e.g., a dataset controller 114, may analyze the log data to determine the events in the log data to add to the dataset. For instance, from the log data shown in Table 2, the dataset system 108 may create a single event with "ABC Airline" as the value for the data name "carrier." The event may include one or both of the timestamps from the log data, e.g., the end time of "1991-02-01T00:00:00Z", the start time of "1991-01-01T00:00:00Z", or both.

Each event has a user-specified a group identifier that specifies which events should be associated together into groups. In this example, the group identifier is "197071991". The user can provide the same group identifier for all events that relate to the same activity or that otherwise should be associated with each other. The query processing system 118 can then use the user-specified group identifiers to associate other events with the event in an index of groups. A user can identify a group of events, e.g., an activity, by specifying the same group identifier for multiple events that all relate to each other, e.g., to the same activity. One group of events may describe a flight by ABC Airline in region D with an origin, destination, distance, and total number of passengers, each of which are a separate event for the group. In the example shown in Table 2, each of the five entries in the log data, separated by newlines, include different names for data associated with the same group of events, which is a particular flight by ABC Airline. Although not shown in Table 2, the log data can include additional lines of data for "passengers," "distance," "origin_city_name," and "dest_city_name" that also have the same groupID of 197071991.

The dataset controller 114 may create a dataset using all of the events determined from the log data using the request. For instance, as described in more detail below, the dataset controller 114 may create an entry in a global state queue 116 for the received request. When the dataset controller 114, or another dataset controller, is able to work on an entry, the dataset controller 114 queries the global state queue 116 for an entry. In response, the dataset controller determines an entry from the global state queue 116 on which to work. The dataset controller 114 may analyze all of the log data for the entry that was identified by the request to determine the events with names specified by the data names or all events when the request does not include any data names. In some examples, the dataset controller 114 may create an inverted index as the dataset.

The dataset controller 114 may provide the dataset to serving nodes 120, included in the query processing system 118. The serving nodes 120 host the dataset for analysis by one or more query processing nodes 122 that can each infer predicted events using the dataset. Once the dataset controller 114 has provided the dataset to the serving nodes 120, the dataset controller 114 may provide the inference controller 104 with a message indicating that the dataset was successfully created. The inference controller 104 may use the message to notify the client device 102 about the dataset.

The inference controller 104 may receive one or more requests from the client device 102 for a list of datasets to which the client device has access, a list of the status of the datasets to which the client device 102 has access, or both. The request may include an identifier for the client device 102, e.g., an authentication token.

The inference controller 104 may provide the list request to the dataset system 108. For instance, the request translation module 106 may convert the list request to another format that is specific to the dataset system 108. The dataset system 108 may determine the datasets to which the client device 102 has access, e.g., using the authentication module, the status of the datasets to which the client device 102 has access, or the status of the particular dataset. The authentication module 110 may use the identifier to determine the datasets to which the client device 102 has access. When the list request is specific to a particular dataset, the authentication module 110 may determine whether the client device 102 has access to the particular dataset using the identifier. Some examples of statutes include unknown, e.g., when the dataset system 108 did not receive a request to create the particular dataset, pending, loading, loaded, unloading, unloaded, and failed, which are described in more detail below.

The inference controller 104 receives a response from the dataset system 108. The inference controller 104 provides a response to the client device 102. For example, the request translation module 106 may convert the response from the dataset system 108 to another format for the client device 102.

In some implementations, the inference controller 104 may analyze requests received from the client device 102 to determine a destination for the request. For instance, the inference controller 104 may determine whether the request is to create a dataset, list a status for a dataset, or both, and provide data from the request to the dataset system 108. When the inference controller 104 determines that the request is for a query from a loaded dataset, e.g., an inference request, the inference controller may forward the request to the query processing system 118.

The inference controller 104 may receive an inference request from the client device 102 that requests the top five cities to which ABC Airline is likely to fly. The inference request may specify a file that includes data for the query or include the data for the query. One example of a query for this example is shown in Table 3, below.

TABLE 3

Inference Request

{ name: "ntsb_airline",
queries: [
    {    query: {
    type:"TYPE_TERM",
    term: {
        name:"carrier_name",
        value:"ABC Airlines" } },
    distribution_configs: {
    data_name:"dest_city_name",
    max_result_entries:5 } } ] }

The inference request in Table 3 indicates that the query processing system 118 should determine the destination cities, indicated by "dest_city_name", that have the highest correlation with the "carrier_name" "ABC Airlines", with a maximum limit of five, as indicated by "max result entries: 5", using the dataset "ntsb_airline". The request translation module 106 may convert the inference request from a first format to a second format specific to the query processing system 118. The inference controller 104 or the request translation module 106 may provide data for the inference request, e.g., the converted request, to the query processing system 118.

The query processing system 118 may send a request to the dataset system 108 to determine the status of the dataset "ntsb_airline" to determine whether the dataset exists and can be queried, e.g., is not being unloaded. In some examples, the query processing system 118, or the inference controller 104, may determine whether the client device 102 has access to the requested dataset. For instance, the query processing system 118 may request that the authentication module 110 determine whether the client device 102 should be allowed access to inference requests computed using the dataset.

When the query processing system 118 determines that the dataset is loaded for processing, and optionally that the client device 102 has access to the dataset, the query processing system 118 may provide data for the request to one of the query processing nodes 122. For instance, the query processing system 118 may select one of multiple query processing nodes 122 to compute predicted events using the dataset stored on the serving nodes 120, e.g., for datasets specified by the inference request, and the request. The selected query processing node 122 may calculate probabilities of events occurring given the conditions specified in the request, e.g., the airline and the request for the top five destination cities. The selected query processing node 122 may filter, weight, or both, events as part of the inference. The selected query processing node 122 may determine the filtering, weighting, or both, using data specified in the request, e.g., a filter for only the top five cities, using data for the client device 102, e.g., parameters for the client device 102 or a corresponding account, or both. In some examples, the selected query processing node 122 may examine tens of thousands of event groups, each of which may include multiple events, and tens of millions of events for a single query, across hundreds of machines. The selected query processing node 122 may perform large scale, real-time, distributed inference across this data while a small query latency, e.g., milliseconds, using an inverted index.

The selected query processing node 122 may provide results of the predicted events to the inference controller 104. The inference controller 104 may provide the results back to the client device 102. In some examples, the request translation module 106 may convert the results of the predicted events to other format before the results are provided to the client device 102. Table 4, below, is one example of inference results for the top five destination cities for ABC Airlines.

TABLE 4

Inference Results

```
{ "results": [ {
"distributions": [
{ "dataName": "dest_city_name",
    "matchedGroupCount": "5",
    "totalGroupCount": "996",
    "entries": [
    {    "value": "dest_city_name=Rochester, NY",
        "score": 4.384068,
        "matchedGroupCount": "5",
        "totalGroupCount": "39" },
    {    "value": "dest_city_name=Minneapolis, MN",
        "score": 3.9661922,
        "matchedGroupCount": "5",
        "totalGroupCount": "45" },
    {    "value": "dest_city_name=Charleston, SC",
        "score": 3.1338928,
        "matchedGroupCount": "5",
        "totalGroupCount": "63" },
    {    "value": "dest_city_name=San Jose, CA",
        "score": 2.2839043,
        "matchedGroupCount": "5",
        "totalGroupCount": "99" },
    {    "value": "dest_city_name=Pago Pago, TT",
        "score": 1.9197994,
        "matchedGroupCount": "4",
        "totalGroupCount": "66"
} ] } ] } ]  }
```

In Table 4, the first result, with a score of 4.384068, is "Rochester, N.Y." Here, the selected query processing node 122 determined that the most likely destination city for ABC Airlines is Rochester, N.Y. using the dataset for the ntsb_airline dataset.

The score may represent a correlation between the results and the conditions. For instance, in the airline example, the score may represent a correlation between ABC Airline and the particular destination city given all of the cities to which ABC Airline flies. In some examples, a score may represent a probability that ABC Airline flies a flight to the destination city. In some examples, the score may be a value between zero and one, inclusive.

In some implementations, the selected query processing node 122 may search multiple event groups in a dataset for predicted events. A matched group count, "matchedGroupCount," may indicate a number of groups that include both the corresponding predicted event, e.g., the particular destination city, and the reference parameter, e.g., ABC Airlines. A total group count, e.g., "totalGroupCount," may indicate a number of event groups that include the predicted event, e.g., the particular destination city, but do not necessarily include the reference parameter, although some of the event groups for the total group count may include the reference parameter.

In some implementations, the query processing system 118 may select multiple query processing nodes 122 to perform work for a single inference query. For instance, the query processing system 118 may determine the size of the dataset to which the inference query relates or query parameters for the inference query indicate that multiple query processing nodes 122 should compute the predicted events using data for the dataset from the serving nodes 120.

In some implementations, an inference request may specify multiple queries. For instance, a client device 102 may include multiple queries for predicted events given a single dataset in a single request. The client device 102 may request both the top five destination cities and the average distance of flights for the airline or inbound flights to those top five destination cities.

In some implementations, an inference request may include a result configuration, inference parameters, or both. The request translation module 106 may use the result configuration when converting the inference results from a format generated by the query processing system 118 to a different format for the client device 102. The request translation module 106 may remove data for the results configuration from the request that is sent to the query processing system 118. The query processing system 118 may receive a query that includes inference parameters, such as weights, filters, or other parameters. The query processing system 118 may use the inference parameters when determining inference results.

The inference system 103, that includes the inference controller 104, the dataset system 108, and the query processing system 118, is an example of a system implemented as computer programs on one or more computers in one or more locations, in which the systems, components, and techniques described in this document are implemented. The client device 102 may include personal computers, mobile communication devices, and other devices that can send and receive data over a network. The network (not shown), such as a local area network (LAN), wide area network (WAN), the Internet, or a combination thereof, connects the client device 102 and the inference system 103. The network may be the same network or may include an internal network that connects the inference controller 104, the dataset system 108, and the query processing system 118. The inference system 103 may use a single server computer or multiple server computers operating in conjunction with one another, including, for example, a set of remote computers deployed as a cloud computing service.

Figure 2:
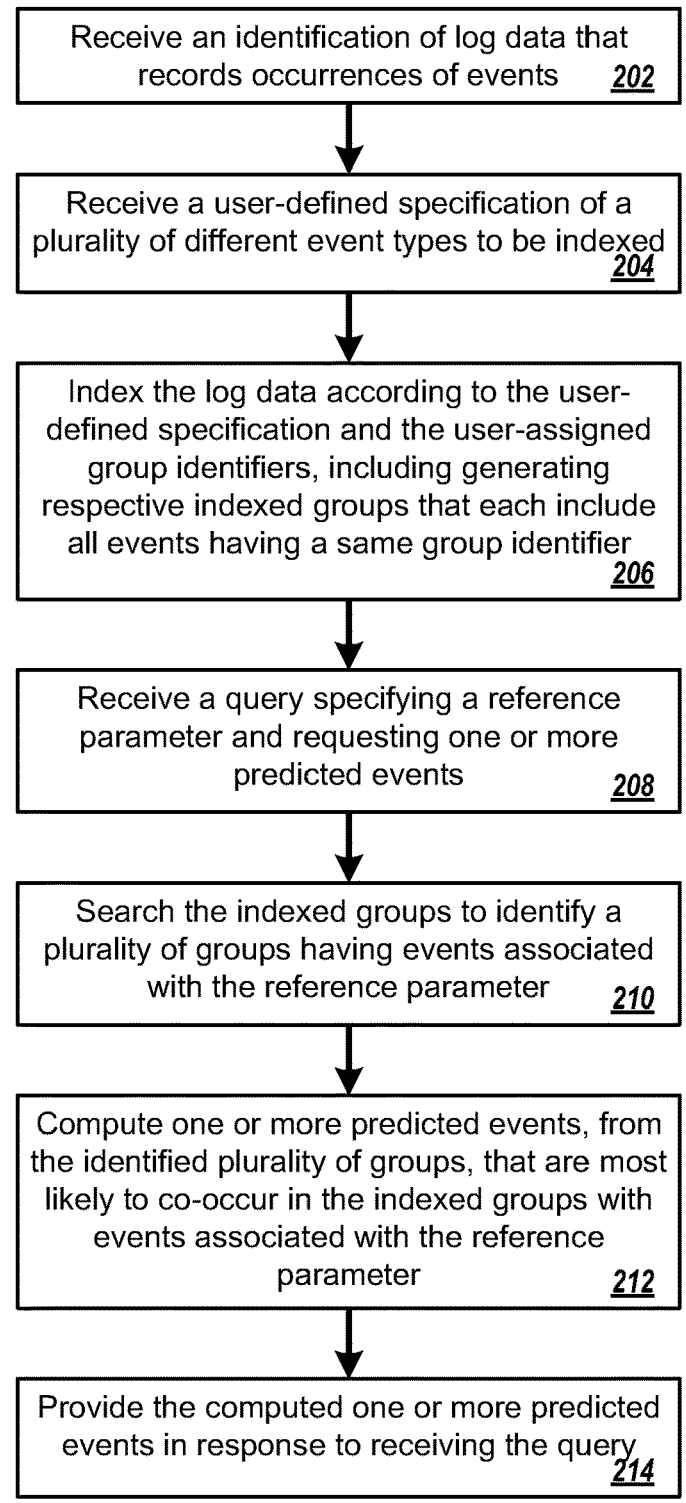
FIG. 2 is a flow diagram of a process for receiving data for predicted events in response to a query.

FIG. 2 is a flow diagram of a process 200 for receiving data for predicted events in response to a query. The process can be implemented by one or more computer programs installed on one or more computers. For example, the process 200 can be used by an inference controller, a dataset system, a query processing system, or a combination of two or more of these. For instance, an inference system 103, that includes the inference controller 104, the dataset system 108, and the query processing system 118 from the environment 100, may perform the process 200.

An inference system receives an identification of log data that records occurrences of events (202). The log data associates each event with one or more respective attributes and a respective user-assigned group identifier. The user-assigned group identifiers allow a user to specify how the log data should be organized and indexed by groups. The one or more respective attributes may include an event time. The event time may include a start time, and end time, or both. The inference system may receive the identification of the log data as part of a request to index the log data.

In general, the identification of log data exposes, in one way or another, one or more data sources to the inference system. This can mean that a user explicitly uploads the log data to the inference system. Alternatively, the user can provide can provide one or more uniform resource identifiers (URIs) to the inference system, and the inference system can automatically fetch the data sources from the one or more URIs. Each of the uniform resource identifiers may indicate a respective location at which log data is stored. The inference system may receive the uniform resource identifier in the request to index the log data.

The inference system receives a user-defined specification of a plurality of different event types to be indexed (204). The inference system may receive the user-defined specification as part of a request to index log data. The inference system may receive an identifier for a file, e.g., a uniform resource identifier, that includes the user-defined specification.

In some implementations, the inference system receives a single request that identifies both the log data and the user-defined specification. For instance, the single request may include one or more first uniform resource identifiers that each identify a location at which some of the log data is stored and a second uniform resource identifier that identifies a location at which the user-defined specification is stored.

The inference system indexes the log data according to the user-defined specification and the user-assigned group identifiers, including generating respective indexed groups that each include all events having a same group identifier (206). The inference system can associate all events having a same user-assigned group identifier with a single group. For example, the system can generate a single document that includes data representing all events having the same user-specified group identifier. The document can be a record in a database or an electronic document, which may, but need not, correspond to a file in a file system.

The system can then index the groups by associating each searchable parameter, e.g., an event or an attribute, with every group having an instance of the parameter. In some implementations, the system defines each searchable parameter as a unique term in a dictionary of terms. The system can then generate an inverted index having a posting list for each unique term generated for the searchable parameters. Each posting list for a term then provides a list of indexed documents that have an instance of the term representing a searchable parameter.

In one example, a user can expose log data to the inference system that contains data for one or more events associated with multiple airline flights, with each flight having one or more attributes, e.g., origin, destination, number of passengers, distance, etc. The user-provided log data can associate multiple different aspects of each flight with a single group identifier. The system can then generate a single document item of log data having the same group identifier and can then index the generated documents.

For example, the inference system may perform one or more steps of the process 400 described with reference to FIG. 4, below, to index the log data.

The inference system receives a query specifying a reference parameter and requesting one or more predicted events (208). The predicted events are events identified by the log data that are most likely to co-occur, in the indexed groups, with events associated with the reference parameter. The query may specify a time. The specified time may include a start time, an end time, or both. The inference system uses the reference parameter, as a condition, to determine the one or more predicted events, as described in more detail in the following steps.

The inference system searches the indexed groups to identify a plurality of groups having events associated with the reference parameter (210). For example, the inference system may determine groups of events that have the reference parameter ABC Airlines.

When the query specifies a time, the inference system may search the indexed groups to identify the plurality of groups having events within a time period determined by the specified time. The time period may be the same year; same month; same week; same hour; same time of day, e.g., morning, afternoon, evening, night, or a combination of two or more of these; or the exact same time; or a combination of two or more of these, as the specified time.

When the query specifies both a start time and an end time, the inference system may determine a time period using both the start time and the end time. For instance, the beginning of the time period may be the same as the start time and the ending of the time period may be the same as the end time.

The inference system computes one or more predicted events, from the identified plurality of groups, that are most likely to co-occur in the indexed groups with events associated with the reference parameter (212). For instance, the inference system computes predicted destination cities, e.g., "dest_city_name," using the reference parameter ABC Airlines. The inference system may predict a particular number of predicted events, e.g., five, ten, or fifty, based on the inference query. For example, the inference query may indicate that only five of the predicted events are requested.

The inference system may determine scores for multiple events included in a dataset. The inference system may use the scores to determine the one or more predicted events, e.g., responsive to an inference query that specifies the reference parameter and requests the one or more predicted events. The score for an event given a reference parameter can represent a likelihood of the event occurring in an indexed document having the reference parameter P(event|query) compared to the general likelihood of the event occurring in all documents P(event). When the inference system stores event data in documents, the inference system may estimate P(event|query) using a number of documents that include the particular event and a number of documents that include the particular event and the reference parameter. The system can also estimate P(event) using a number of documents that include the event and a number of documents in the dataset. The inference system can determine a score for the particular event, Score(event|query), using Equation (1) below.

$$\text{Score}(event|query)=P(event|query)/P(event) \quad (1)$$

In some implementations, the inference system may combine P(event) with a normalization value x for the number of documents included in the dataset. For instance, the inference system may compute Score(event|query) using Equation (2) below where the normalization value x controls how much P(event) is used to determine the score for the particular event. In some implementations, the system restricts the value for x to be between zero and one, inclusive, e.g., [0.0, 1.0]. When x is zero, the score for the particular event may be a raw, conditional probability based on the probability of the particular event given the reference parameter. For instance, when x is zero, the value of "$P(event)^x$" is one, e.g., $P(event)^x=P(event)^x$. When x is one, the score for the particular event may be lifted, e.g., adjusted for a context of the particular event, based on the number of occurrences of the particular event in the dataset, e.g., the documents. A context may be the dataset to which the inference query applies, the number of occurrences of the reference parameter in the dataset, or the number of occurrences of the particular event in the dataset, to name a few examples. In some examples, when the score for the particular event is lifted using a value for x, the inference system may increase the score given the context of the particular event, e.g., the number of occurrences of the particular event in the dataset.

$$\text{Score}(\text{event}|\text{query}) = P(\text{event}|\text{query})/(P(\text{event})\hat{\ }x) \qquad (2)$$

The inference system provides the computed one or more predicted events in response to receiving the query (214). The inference system may provide, for each predicted event in the computed one or more predicted events, a score indicating a likelihood that the predicted event will occur given the reference parameter. The inference system may provide, for each predicted event in the computed one or more predicted events, a value indicating a total quantity of event occurrences that include the reference parameter and the predicted event. The inference system may provide, for each predicted event in the computed one or more predicted events, a value indicating a quantity of groups in the plurality of groups that include the reference parameter and the predicted event.

A client device may receive the one or more predicted events and perform an action in response. For instance, when the predicted events relate to network security, the client device, or a system that includes the client device, may adjust settings on an intrusion detection system, an intrusion prevention system, or both, to reduce a likelihood of the predicted events occurring. The client device may install a software update, a new security application, or both, to reduce the likelihood of the predicted events occurring.

The order of steps in the process 200 described above is illustrative only, and receiving the data for the predicted events in response to a query can be performed in different orders. For example, the inference system may receive the user-defined specification and then receive identification of the log data. In some examples, the inference system may receive the user-defined specification and the identification of the log data in a single request.

In some implementations, the process 200 can include additional steps, fewer steps, or some of the steps can be divided into multiple steps. For example, the inference system may receive a query, search the indexed groups, compute multiple predicted events, and provide the predicted events, e.g., perform steps 208 through 214, without performing the other steps of the process 200.

Figure 3:
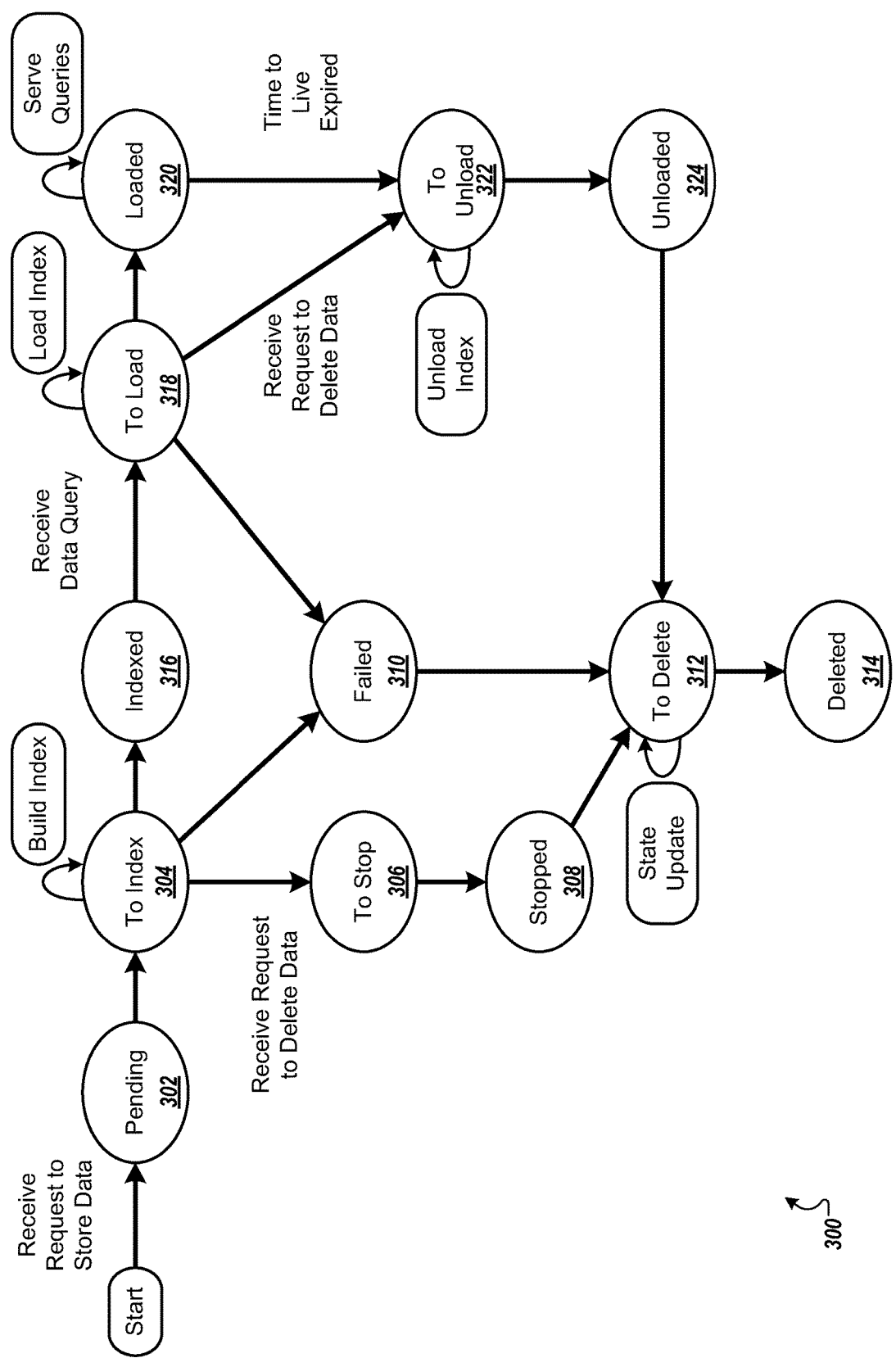
FIG. 3 is an example of a state machine for a dataset.

FIG. 3 is an example of a state machine 300 for a dataset. The inference system, described with reference to FIG. 1, can perform one or more steps for a dataset to move the dataset between states in the state machine 300.

For instance, the inference system may begin by receiving a request to store data from a client device. The inference system may place an entry on a global state queue indicating that a request to create a dataset is pending 302, in response to receipt of the request to store data from the client device.

Multiple dataset controllers may query the global state queue while the request to create the dataset is pending 302 to determine datasets to create, e.g., when the global state queue identifies multiple different datasets to create. A dataset controller may perform one or more steps of the process 400, described below, to select a dataset to index 304. For instance, the dataset controller may perform steps 406 through 416 to select a dataset to index 304.

The dataset controller may begin the process create a dataset index for the request to store data received from the client device. The dataset controller may create any appropriate type of dataset other than an index. The dataset controller may determine whether the inference system has received a request to delete the data, e.g., during the index creation process. When the dataset controller determines that the inference system has received a request to delete the data, the dataset controller determines to stop 306 creation of the index. In response, the dataset controller stops 308 creating the index.

In some examples, when the dataset controller is creating the dataset index, the dataset controller may fail 310. A dataset controller may fail when the dataset controller crashes, when a system on which the dataset controller is included crashes, when a dataset controller loses power, or for another reason.

When the dataset controller fails 310 or stops 308 creation of the dataset index, the dataset controller determines to delete 312 any portion of the dataset index that has been created. The dataset controller may delete any reference to the dataset index from memory in addition to the dataset index and data for the request to create the dataset. Once the dataset controller has completed the deletion process, the dataset is deleted 314.

When the dataset controller determines that the inference system has not received a request to delete the data and has not failed, the dataset controller continues the indexing process until the dataset is indexed 316. The dataset controller may provide the dataset index to one or more serving nodes that will host the dataset index for query processing. In some implementations, the dataset controller may provide the dataset index to a repository, e.g., that has a higher latency than the serving nodes.

When the inference system receives a data query for the dataset index, the inference system may determine to load 318 the dataset index. For instance, when the dataset index is stored only on the repository, the inference system determines to load 318 the dataset index to the serving nodes for lower latency access and determination of predicted events using the dataset index.

Once the dataset index is loaded 320, the inference system may serve queries for the dataset index. For instance, a query processing system may receive one or more inference queries that each request predicted events given reference parameters using the dataset index.

When the dataset index is loaded or indexed and not loaded, the inference system may receive a request to delete the dataset index or determine that a time to live period for the dataset index has expired. For instance, the inference system may receive a request from a client device to delete the dataset index, whether the dataset index is loaded on a serving node, stored on a repository, or both. When the dataset index is loaded, the inference system determines to unload 322 the dataset index to move the dataset index to an unloaded state 324. The inference system then determines to delete 312 the dataset index and deletes 314 the dataset index, as described above.

In some examples, the inference system may fail 310 loading 318 of the dataset index. For instance, the inference system may fail 310 loading 318 of the dataset index upon determining that resources are not available for the dataset index. Upon failing, the inference system determines to delete 312 the dataset index, and deletes 314 the dataset index.

Figure 4:
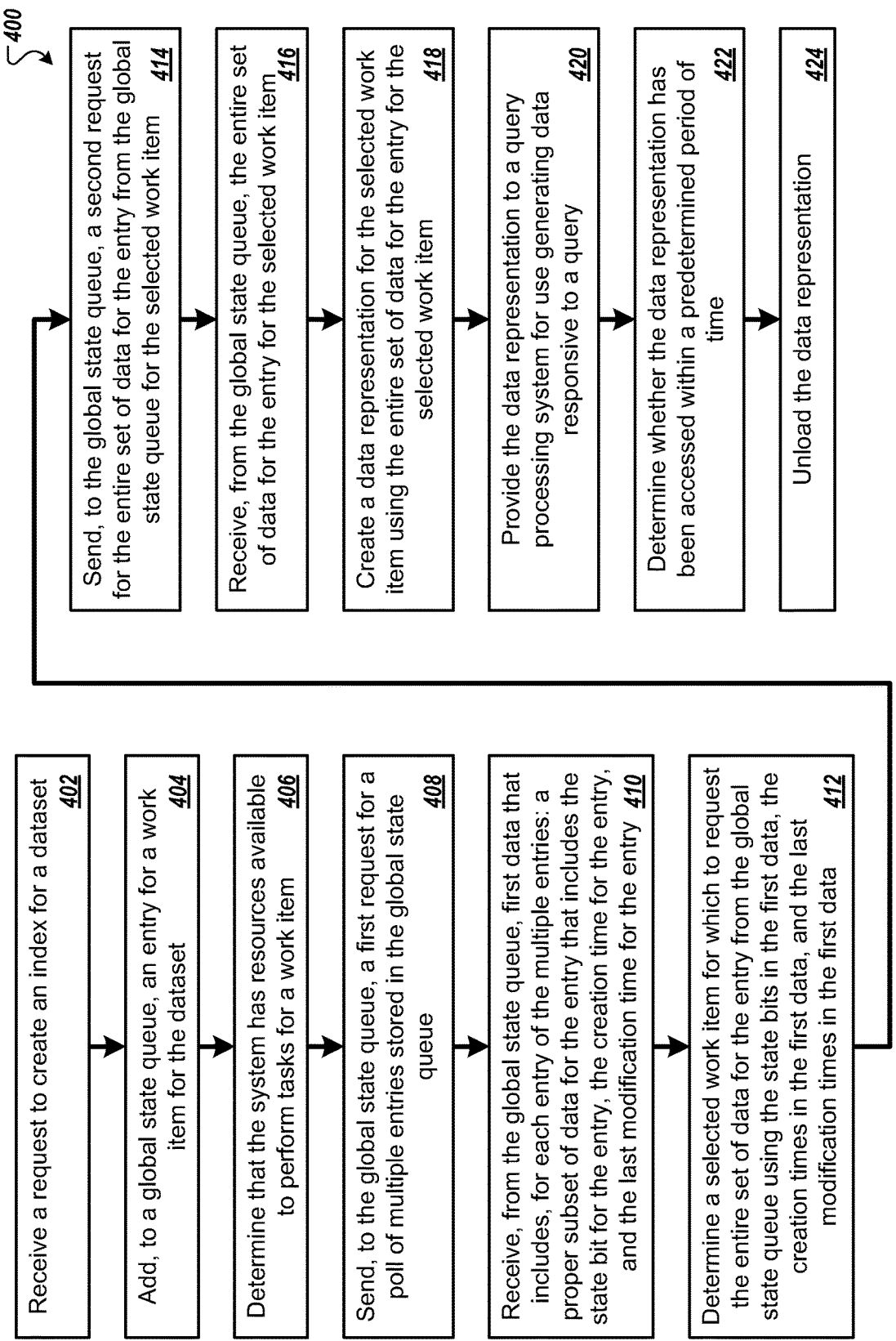
FIG. 4 is a flow diagram of a process for selecting a work item from a global state queue.

FIG. 4 is a flow diagram of a process 400 for selecting a work item from a global state queue. The work item may indicate a dataset for an inference system to create, e.g., to allow the inference system to determine predicted events using the dataset. The process can be implemented by one or more computer programs installed on one or more computers. For example, the process 400 can be used by a dataset system or a dataset controller or both. One example of a dataset system is the dataset system 108 from the environment 100. One example of a dataset controller is the dataset controller 114 from the environment 100.

A dataset system receives a request to create an index for a dataset (402). For instance, an inference system, that includes the dataset system, may receive a request from a client device to create a dataset. The inference system may provide data for the request to the dataset system to cause the dataset system to create the index for the dataset.

The dataset system adds, to a global state queue, an entry for a work item for the dataset (404). A work item may identify data for which the system has received a request to create a corresponding index. The entry has a set of data that includes a state bit indicating that the entry is not assigned to a dataset controller, a creation time for the entry, and a last modification time for the entry in response to receiving the request to create an index for the dataset. A value for creation time may be the same as a value for the last modification time when the dataset system adds the entry to the global state queue.

In some examples, the dataset system may assign the addition of the entry for the work item to a dataset controller. The assigned dataset controller then adds the entry for the work item to the global state queue.

The dataset system determines that the system has resources available to perform tasks for a work item (406). For instance, the dataset system, e.g., a dataset controller, determines whether computer resources, such as memory, e.g., random access memory or a non-volatile memory, processor cycles, or both, are available to perform tasks for a work item.

The dataset system sends, to the global state queue, a first request for a poll of multiple entries stored in the global state queue (408). For example, the dataset controller that has resources available to perform tasks for the work item sends the first request to the global state queue. Each entry in the multiple entries identifies a work item, and each entry in the multiple entries has a set of data that includes a state bit, a creation time, a last modification time, and additional data. The set of data may include a completion time. Step 408 may be responsive to determining that the system has resources available to perform tasks for a work item, e.g., step 406. In some examples, the dataset system may send, to the global state queue, the first request for a poll of all entries in a predetermined range of rows in the global state queue.

The dataset system receives, from the global state queue, first data that includes, for each entry of the multiple entries: a proper subset of data for the entry that includes the state bit for the entry, the creation time for the entry, and the last modification time for the entry (410). For example, the dataset controller that sent the first request to the global state queue receives the first data from the global state queue. The proper subset of data for the entry includes a portion of the data for the entry and does not include all of the data for the entry, e.g., the dataset system does not receive some of the data for the entry when receiving the proper subset. When the dataset system sends a first request for a poll of all entries in a predetermined range of rows, the dataset system may receive, from the global state queue, the first data that includes, for each entry of the entries in the predetermined range of rows in the global state queue, the proper subset of data for the entry that includes the state bit for the entry, the creation time for the entry, and the last modification time for the entry.

For instance, each entry may include a project identifier, a dataset name, a request identifier, e.g., for the device that requested creation of the dataset, a record owner address, e.g., that indicates a dataset controller working on the entry if there is one, a creation time, a last modification time, a completion time, dataset information, e.g., the source information, a dataset descriptor, a processing state bit, or a combination of two or more of these. In some examples, the dataset information may include the processing status, a time to live, e.g., after which the dataset will be removed from memory, the processing state bit, a state detail, other information, or a combination of two or more of these. When each entry includes a processing state bit, a creation time, a last modification time, a dataset name, a project identifier, and source information, the dataset system would only receive the proper subset of a processing state bit, a creation time, a last modification time for each entry and would not receive a dataset name, a project identifier, and source information.

The dataset system determines a selected work item for which to request the entire set of data for the entry from the global state queue using the state bits in the first data, the creation times in the first data, and the last modification times in the first data (412). For example, the dataset controller that received the first data may use the first data to determine the selected work item. The dataset system may determine, using the state bits in the first data, whether the first data indicates that an entry has not been assigned to a dataset controller, e.g., that a dataset controller is not handling indexing and loading for the entry. The dataset system may determine, using the last modification times in the first data, whether a timeout period for an entry has expired. The dataset system may select an entry that has an oldest creation time that has not been assigned to a dataset controller or that has an oldest creation time for which the timeout period has expired, wherein the selected entry identifies the selected work item.

In some implementations, the dataset system may sort the entries in the multiple entries by creation time. The dataset system may use the sorted entries to determine an oldest entry on which to work, e.g., that is not assigned to another dataset controller or that another dataset controller failed to keep alive.

In some implementations, the dataset system may determine, using the state bits in the third data, the entries that have not been assigned to a dataset controller. The dataset system may determine, using the last modification times in the first data for the entries that have been assigned to a dataset controller, whether a timeout period for an entry has expired. The dataset system may select a second entry that has an oldest creation time that has not been assigned to a dataset controller. The dataset system may select an entry that has been assigned to a dataset controller and that has an oldest creation time for which the timeout period has expired.

In some implementations, the dataset system may determine, using the state bits in the first data for the entries without a completion time specified, whether the first data indicates that an entry has not been assigned to a dataset controller. The dataset system may determine, using the last modification times in the first data for the entries that have been assigned to a dataset controller, whether a timeout period for an entry has expired. The dataset system may select an entry that has an oldest creation time that has not been assigned to a dataset controller or that has an oldest creation time for which the timeout period has expired, wherein the selected entry identifies the selected work item.

The dataset system sends, to the global state queue, a second request for the entire set of data for the entry from the global state queue for the selected work item (414). For example, the dataset controller that received the first data may send the second request to the global state queue. The dataset system, e.g., the dataset controller that received the first data, may send a request to change a state bit for an entry that identifies the selected work item to assigned, e.g., to indicate that the work item has been assigned to a dataset controller.

The dataset system receives, from the global state queue, the entire set of data for the entry for the selected work item (416). The dataset system, e.g., the dataset controller that sent the second request, may receive second data that includes data only for the entire set of data for the entry for the selected work item. A second size of the second data may be greater than a first size of the first data. For example, all of the first data may be only a few hundred bytes in size while a portion of the second data, e.g., the dataset information, may alone be larger the all of the first data.

The entire set of data for the entry may include the processing status, a time to live, e.g., after which the dataset will be removed from memory, the processing state bit, a state detail, and other information for the entry. For instance, when the first data includes a processing state bit, a creation time, a last modification time for each entry, the entire set of data may include a processing state bit, a creation time, a last modification time, a dataset name, a project identifier, and source information for the entry.

The dataset system creates a data representation for the selected work item using the entire set of data for the entry for the selected work item (418). The dataset system, e.g., the dataset controller that received the entire set of data for the entry, may retrieve a dataset identified by the set of data for the entry for the selected work item. The dataset system may create an inverted index for the selected work item using the retrieved dataset.

The dataset system may create a document that includes data for an event, a group of events, or both. The dataset system may create a document that includes data for the dataset associated with the selected work item. The document may include separate data for each event.

The dataset system provides the data representation to a query processing system for use generating data responsive to a query (420). The dataset system may store the data representation in memory accessible by the query processing system, e.g., a repository, the serving nodes, or both.

The dataset system determines whether the data representation has been accessed within a predetermined period of time (422). For instance, the dataset system may monitor the data representation to determine a time since the data representation was last accessed. The dataset system may determine a time period between a current time and the time since the data representation was last accessed. If the time period is not longer than the predetermined period of time and the data representation has been accessed within the predetermined period of time, the dataset system maintains the data representation in memory. The predetermined period of time may be specific to the client device, or an account, for which the data representation was created, e.g., as determined by a configuration module.

In response to determining that the data representation has not been accessed within the predetermined period of time, the dataset system unloads the data representation (424). For instance, the dataset system removes the data representation from memory, e.g., deletes the data representation.

The order of steps in the process 400 described above is illustrative only, and selecting the work item from the global state queue can be performed in different orders. For example, the dataset system may create a data representation and then receive a request to create an index for a dataset and add a corresponding entry for a work item for the dataset to the global state queue.

In some implementations, the process 400 can include additional steps, fewer steps, or some of the steps can be divided into multiple steps. For example, the dataset system may perform steps 408 through 416 or steps 408 through 418 without performing any of the other steps of the process 400.

In some implementations, the process 400 may be performed as part of the process 200, e.g., as part of the receipt of the identification of the log data, the receipt of the user-defined specification, and the indexing of the log data according to the user-defined specification.

Implementations of the subject matter and the functional operations described in this disclosure can be implemented in digital electronic circuitry, in tangibly-embodied computer software or firmware, in computer hardware, including the structures disclosed in this disclosure and their structural equivalents, or in combinations of one or more of them. Implementations of the subject matter described in this disclosure can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this disclosure can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this disclosure can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 5:
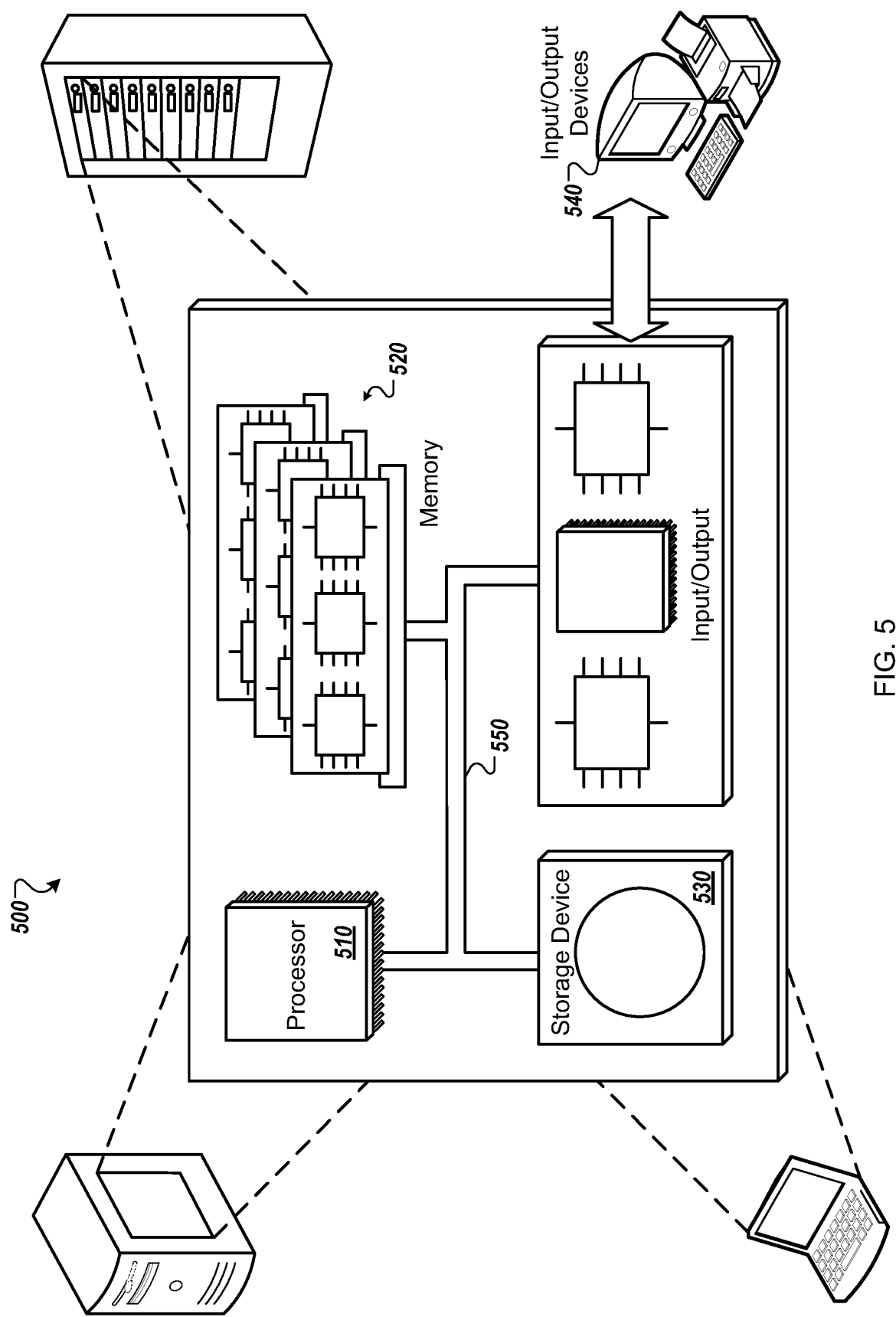
FIG. 5 is a block diagram of a computing system that can be used in connection with computer-implemented methods described in this document.

An example of one such type of computer is shown in FIG. 5, which shows a schematic diagram of a generic computer system 500. The system 500 can be used for the operations described in association with any of the computer-implemented methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

Implementation 1 is a method including: receiving an identification of log data that records occurrences of events, wherein the log data associates each event with one or more respective attributes and a respective user-assigned group identifier; receiving a user-defined specification of a plurality of different event types to be indexed; indexing the log data according to the user-defined specification and the user-assigned group identifiers, including generating respective indexed groups that each include all events having a same group identifier; receiving, from a user device, a query specifying a reference parameter and requesting one or more predicted events, the predicted events being events identified by the log data that are most likely to co-occur, in the indexed groups, with events associated with the reference parameter; searching the indexed groups to identify a plurality of groups having events associated with the reference parameter; computing one or more predicted events, from the identified plurality of groups, that are most likely to co-occur in the indexed groups with events associated with the reference parameter; and providing, to the user device, the computed one or more predicted events in response to receiving the query.

Implementation 2 is the method of implementation 1, wherein: the one or more respective attributes include an event time.

Implementation 3 is the method of any one of implementations 1 through 2, wherein: receiving, from the user device, the query specifying the reference parameter includes receiving the query specifying a time.

Implementation 4 is the method of any one of implementations 1 through 3, wherein: searching the indexed groups to identify the plurality of groups having events associated with the reference parameter includes searching the indexed groups to identify the plurality of groups having events within a time period determined by the specified time.

Implementation 5 is the method of any one of implementations 2 through 4, wherein: wherein the event time includes a start time and an end time.

Implementation 6 is the method of any one of implementations 1 through 5, wherein: receiving, from the user device, the identification of the log data that records occurrences of events includes receiving one or more uniform resource identifiers that indicate one or more locations at which the log data is stored.

Implementation 7 is the method of implementation 6, wherein: indexing the log data according to the user-defined specification and the user-assigned group identifiers includes retrieving the log data using the one or more uniform resource identifiers that indicate the one or more locations at which the log data is stored.

Implementation 8 is the method of any one of implementations 1 through 7, wherein: receiving, from the user device, the user-defined specification of the plurality of different event types to be indexed includes receiving an identifier for a file that includes the user-defined specification of the plurality of different event types.

Implementation 9 is the method of implementation 8, wherein: receiving the identifier for the file that includes the user-defined specification of the plurality of different event types includes receiving the identifier for the file that includes the user-defined specification of the plurality of different event types and the identification of the log data the records occurrences of events.

Implementation 10 is the method of any one of implementations 1 through 9, wherein: providing, to the user device, the computed one or more predicted events in response to receiving the query includes providing, for each predicted event in the computed one or more predicted events, a score indicating a likelihood that the predicted event will occur given the reference parameter.

Implementation 11 is the method of any one of implementations 1 through 10, further including: computing a score indicating a likelihood that the predicted event will occur given the reference parameter.

Implementation 12 is the method of implementation 11, wherein: computing the score indicating a likelihood that the predicted event will occur given the reference parameter includes computing, using a normalization value, the score indicating a likelihood that the predicted event will occur given the reference parameter.

Implementation 13 is the method of implementation 12, wherein: computing, using a normalization value, the score indicating a likelihood that the predicted event will occur given the reference parameter includes computing the score using a normalization value to adjust the score for a context of the predicted event.

Implementation 14 is the method of any one of implementations 1 through 13, wherein: providing, to the user device, the computed one or more predicted events in response to receiving the query includes providing, for each predicted event in the computed one or more predicted events, a value indicating a total quantity of event occurrences that include the reference parameter and the predicted event.

Implementation 15 is the method of any one of implementations 1 through 14, wherein: wherein providing, to the user device, the computed one or more predicted events in response to receiving the query includes providing, for each predicted event in the computed one or more predicted events, a value indicating a quantity of groups in the plurality of groups that include the reference parameter and the predicted event.

Implementation 16 is a system including: one or more computers and one or more storage devices storing instructions that are operable, when executed by the one or more computers, to cause the one or more computers to perform operations of any of implementations 1 through 15.

Implementation 17 is a computer storage medium encoded with a computer program, the program including instructions that are operable, when executed by data processing apparatus, to cause the data processing apparatus to perform operations of any of implementations 1 through 15.

Implementation 18 is the method of any one of implementations 1 through 15, further including: sending, to a global state queue, a first request for a poll of multiple entries stored in the global state queue, wherein each entry in the multiple entries identifies a work item, and each entry in the multiple entries has a set of data that includes a state bit, a creation time, a last modification time, and additional data; receiving, from the global state queue, first data that includes, for each entry of the multiple entries: a proper subset of data for the entry that includes the state bit for the entry, the creation time for the entry, and the last modification time for the entry; determining a selected work item for which to request the entire set of data for the entry from the global state queue using the state bits in the first data, the creation times in the first data, and the last modification times in the first data; sending, to the global state queue, a second request for the entire set of data for the entry from the global state queue for the selected work item; and receiving, from the global state queue, the entire set of data for the entry for the selected work item.

Implementation 19 is the method of implementation 18, wherein: determining the selected work item for which to request the entire set of data for the entry from the global state queue using the state bits in the first data, the creation times in the first data, and the last modification times in the first data includes: determining, using the state bits in the first data, whether the first data indicates that an entry has not been assigned to a dataset controller; determining, using the last modification times in the first data, whether a timeout period for an entry has expired; and selecting an entry that has an oldest creation time that has not been assigned to a dataset controller or that has an oldest creation time for which the timeout period has expired, wherein the selected entry identifies the selected work item.

Implementation 20 is the method of any one of implementations 18 through 19, further including: sending, to the global state queue, a third request for a poll of multiple entries stored in the global state queue; receiving, from the global state queue, third data that includes, for each entry of the multiple entries, a second proper subset of data for the entry that includes the state bit for the entry, the creation time for the entry, and the last modification time for the entry; determining, using the state bits in the third data, the entries that have not been assigned to a dataset controller; and selecting a second entry that has an oldest creation time that has not been assigned to a dataset controller; sending, to the global state queue, a fourth request for the entire set of data for the second entry from the global state queue, wherein the second entry identifies a second selected work item, wherein: determining, using the last modification times in the first data, whether a timeout period for an entry has expired includes determining, using the last modification times in the first data for the entries that have been assigned to a dataset controller, whether a timeout period for an entry has expired; and selecting the entry that has an oldest creation time that has not been assigned to a dataset controller or that has an oldest creation time for which the timeout period has expired includes selecting an entry that has been assigned to a dataset controller and that has an oldest creation time for which the timeout period has expired.

Implementation 21 is the method of any one of implementations 18 through 20, wherein: each entry has a set of data that includes a state bit, a creation time, a last modification time, and a completion time.

Implementation 22 is the method of any one of implementations 18 through 21, wherein: wherein determining the selected work item for which to request the entire set of data for the entry from the global state queue using the state bits in the first data, the creation times in the first data, and the last modification times in the first data includes: determining, using the state bits in the first data for the entries without a completion time specified, whether the first data indicates that an entry has not been assigned to a dataset controller; determining, using the last modification times in the first data for the entries that have been assigned to a dataset controller, whether a timeout period for an entry has expired; and selecting an entry that has an oldest creation time that has not been assigned to a dataset controller or that has an oldest creation time for which the timeout period has expired, wherein the selected entry identifies the selected work item.

Implementation 23 is the method of any one of implementations 18 through 22, wherein: a work item identifies data for which the system has received a request to create a corresponding index.

Implementation 24 is the method of implementation 23, further including: receiving a request to create an index for a dataset; and adding, to the global state queue, an entry for a work item for the dataset, wherein the entry has a set of data that includes a state bit indicating that the entry is not assigned to a dataset controller, a creation time for the entry, and a last modification time for the entry in response to receiving the request to create an index for the dataset.

Implementation 25 is the method of implementation 24, wherein: adding, to the global state queue, the entry for the work item for the dataset includes adding, to the global state queue, the entry that has a set of data that includes a creation time for the entry, and a last modification time for the entry that has a value that is the same as a value for the creation time for the entry.

Implementation 26 is the method of any one of implementations 18 through 25, wherein: sending, to the global state queue, the second request for the entire set of data for the entry from the global state queue for the selected work item including sending, to the global state queue, a request to change the state bit for an entry that identifies the selected work item to assigned.

Implementation 27 is the method of any one of implementations 18 through 26, wherein: receiving, from the global state queue, the entire set of data for the entry for the selected work item includes receiving, from the global state queue, second data that includes data only for the entire set of data for the entry for the selected work item.

Implementation 28 is the method of implementations 27, wherein: receiving, from the global state queue, the second data that includes data only for the entire set of data for the entry for the selected work item includes receiving the second data that has a second size greater than a first size of the first data.

Implementation 29 is the method of any one of implementations 18 through 28, further including: creating a data representation for the selected work item using the entire set of data for the entry for the selected work item.

Implementation 30 is the method of implementation 29, further including: determining that the system has resources available to perform tasks for a work item, wherein sending, to the global state queue, the first request for a poll of multiple entries stored in the global state queue is responsive to determining that the system has resources available to perform tasks for a work item.

Implementation 31 is the method of any one of implementations 29 through 30, wherein: creating the data representation for the selected work item using the entire set of data for the entry for the selected work item includes: retrieving a dataset identified by the set of data for the entry for the selected work item; and creating an inverted index for the selected work item using the retrieved dataset.

Implementation 32 is the method of any one of implementations 29 through 31, further including: providing the data representation to a query processing system for use generating data responsive to a query.

Implementation 33 is the method of implementation 32, wherein: providing the data representation to a query processing system for use generating data responsive to a query includes storing the data representation in memory accessible by the query processing system.

Implementation 34 is the method of any one of implementations 32 through 33, further including: determining whether the data representation has been accessed within a predetermined period of time; and in response to determining that the data representation has not been accessed within the predetermined period of time, unloading the data representation.

Implementation 35 is the method of any one of implementation 34, further including: deleting the data representation from memory in response to determining that the data representation has not been accessed within the predetermined period of time.

Implementation 36 is the method of any one of implementations 18 through 35, wherein: sending, to the global state queue, the first request for a poll of multiple entries stored in the global state queue includes sending, to the global state queue, the first request for a poll of all entries in a predetermined range of rows in the global state queue; and receiving, from the global state queue, the first data that includes, for each entry of the multiple entries, the proper subset of data for the entry that includes the state bit for the entry, the creation time for the entry, and the last modification time for the entry includes receiving, from the global state queue, the first data that includes, for each entry of the entries in the predetermined range of rows in the global state queue, the proper subset of data for the entry that includes the state bit for the entry, the creation time for the entry, and the last modification time for the entry.

Implementation 37 is the method of any one of implementations 18 through 36, wherein: the predetermined range of rows in the global state queue is less than all of the rows in the global state queue.

Implementation 38 is a system including: one or more computers and one or more storage devices storing instructions that are operable, when executed by the one or more computers, to cause the one or more computers to perform operations of any of implementations 18 through 37.

Implementation 39 is a computer storage medium encoded with a computer program, the program including instructions that are operable, when executed by data processing apparatus, to cause the data processing apparatus to perform operations of any of implementations 18 through 37.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this disclosure contains many specific implementation details, these should not be construed as limitations on the scope of what may be claimed, but rather as descriptions of features that may be specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method when executed by data processing hardware causes the data processing hardware to perform operations comprising:
   receiving log data that records occurrences of events, each respective event comprising a corresponding attribute;
   generating index groups using the log data, each respective index group comprising all events in the log data having a same corresponding attribute;
   receiving, from a client device, a query requesting anomaly detection and specifying a time period to perform anomaly detection;
   determining that the client device is authorized to access the index groups; and
   in response to determining that the client device is authorized to access the index groups:
   searching the index groups to identify a respective one of the events within the specified time period;
   determining, for the respective one of the events, a score representing a likelihood that the respective one of the events is an anomaly;
   determining a number of the respective index groups that include the respective one of the events; and
   providing, to the client device, the score for the respective one of the events and the number of the respective index groups to the client device.

2. The computer-implemented method of claim 1, wherein the log data comprises time series data.

3. The computer-implemented method of claim 1, wherein the specified time period comprises a start time and an end time.

4. The computer-implemented method of claim 1, wherein the specified time period comprises a start time or an end time.

5. The computer-implemented method of claim 1, wherein the operations further comprise performing, by the client device, an action responsive to receiving the score for the respective one of the events to the client device.

6. The computer-implemented method of claim 1, wherein the operations further comprise receiving, from the client device, another query specifying a reference parameter and requesting a predicted event.

7. The computer-implemented method of claim 6, wherein each corresponding attribute comprises an event time.

8. The computer-implemented method of claim 1, wherein the operations further comprise receiving a uniform resource indicator indicating a data source storing the log data.

9. The computer-implemented method of claim 8, wherein the operations further comprises retrieving the log data from the data source.

10. The computer-implemented method of claim 1, wherein each respective event further comprises a corresponding group identifier.

11. A system comprising:
    data processing hardware; and
    memory hardware in communication with the data processing hardware, the memory hardware storing instructions that when executed on the data processing hardware cause the data processing hardware to perform operations comprising:
    receiving log data that records occurrences of events, each respective event comprising a corresponding attribute;

generating index groups using the log data, each respective index group comprising all events in the log data having a same corresponding attribute;

receiving, from a client device, a query requesting anomaly detection and specifying a time period to perform anomaly detection;

determining that the client device is authorized to access the index groups; and in response to determining that the client device is authorized to access the index groups:

searching the index groups to identify a respective one of the events within the specified time period;

determining, for the respective one of the events, a score representing a likelihood that the respective one of the events is an anomaly;

determining a number of the respective index groups that include the respective one of the events; and providing, to the client device, the score for the respective one of the events and the number of the respective index groups to the client device.

12. The system of claim 11, wherein the log data comprises time series data.

13. The system of claim 11, wherein the specified time period comprises a start time and an end time.

14. The system of claim 11, wherein the specified time period comprises a start time or an end time.

15. The system of claim 11, wherein the operations further comprise performing, by the client device, an action responsive to receiving the score for the respective one of the events to the client device.

16. The system of claim 11, wherein the operations further comprise receiving, from the client device, another query specifying a reference parameter and requesting a predicted event.

17. The system of claim 16, wherein each corresponding attribute comprises an event time.

18. The system of claim 11, wherein the operations further comprise receiving a uniform resource indicator indicating a data source storing the log data.

19. The system of claim 18, wherein the operations further comprises retrieving the log data from the data source.

20. The system of claim 11, wherein each respective event further comprises a corresponding group identifier.

* * * * *